No. 112,618. J. M. MOREHEAD. PIPE CONNECTION. PATENTED MAR. 14, 1871.
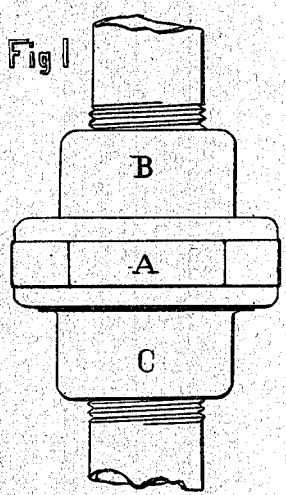
Fig 1
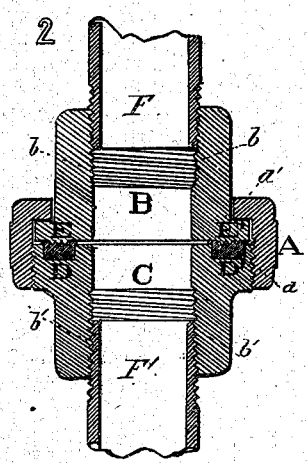
2
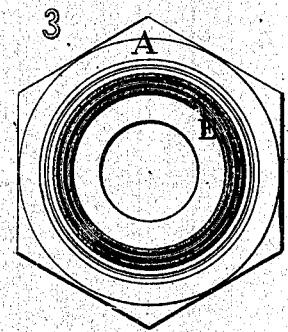
3
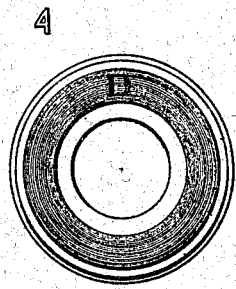
4
Witnesses
Louis W. Frost
Charles G. Coe
Inventor.
James M. Morehead

United States Patent Office.

JAMES M. MOREHEAD, OF BROOKLYN, NEW YORK.

Letters Patent No. 112,618, dated March 14, 1871.

IMPROVEMENT IN PIPE-CONNECTIONS.

The Schedule referred to in these Letters Patent and making part of the same.

*To all whom it may concern:*

Be it known that I, JAMES M. MOREHEAD, of the city of Brooklyn, county of Kings, State of New York, have invented a new and useful Improvement in Unions for Connecting Steam, Gas, and other Pipes; and I do hereby declare the following to be a full, clear, and exact description thereof, to enable others skilled in the art to which the said invention appertains to carry it into effect, reference being had to the accompanying drawing forming a part of this specification, in which—

Figure 1 is the outside elevation of the improved union.

Figure 2 is a sectional view of the same.

Figure 3 is an end view, showing the concentric tongues or ridges on the face side of the union.

Figure 4 is an end view, showing the groove in the face side of the union, with the soft-metal or elastic packing permanently attached.

Similar letters indicate corresponding parts.

This invention relates to a union for connecting steam, gas, and other pipes; and It consists in the combination and arrangement of certain parts, as will hereinafter more fully be described.

In the drawing—

The letter A represents the nut formed with the female screw $a$ and circular lugs $a'$, which nut unites the parts of the union B and C together.

The outer ends $b$ $b'$ of the unions B and C are threaded on their inner surfaces, so as to screw the ends of the threaded pipes F F'.

The part B, which is inserted into the nut A, has formed on its face a series of concentric tongues or ridges, E E', while the face of the part C is formed with one or more grooves, into which is permanently secured or fastened a soft-metal or elastic packing, D D', as clearly shown in figs. 2 and 3.

In connecting pipes together the threaded nut operates so as to unite the parts B and C, which carry the pipes F F' in such a manner that the packing D D' in the face of the part C can be brought to bear and rest upon the concentric tongues or ridges E E' formed upon the face of the part B, whereby a perfectly-tight joint or connection is easily and reliably produced.

The elastic facing or packing is permanently fastened to the face of the unions by the vulcanizing process, or it may simply be placed in the concentric grooves.

It is thus readily seen that the ends of the pipe are united together, the other ends of the pipe being already fastened, and cannot be turned.

The advantage of these unions over the ordinary ones are that they are complete in themselves, always ready for use when required, and there is no delay in connecting pipes by stopping to cut and shape the pieces for packing, as is necessary in other unions.

Having thus described my invention,

What I claim as new, and desire to secure by Letters Patent, is—

The improved unions herein shown, consisting of the parts B and C, formed with the inner threaded surfaces $b$ $b'$, and concentric ridges E E', and groove to receive the packing D D', in combination with the threaded nut A and pipes F F', the whole constructed and operating as herein shown and described, for the purpose set forth.

JAMES M. MOREHEAD.

Witnesses:
LOUIS W. FROST,
CHAS. E. FROST.